(12) United States Patent
Bui et al.

(10) Patent No.: US 7,433,142 B2
(45) Date of Patent: Oct. 7, 2008

(54) USING AT LEAST ONE SERVO CHANNEL TO PROVIDE TIMING RECOVERY AND TIMING INFORMATION TO DATA CHANNELS

(75) Inventors: Nhan Xuan Bui, Tucson, AZ (US); Giovanni Cherubini, Rueschlikon (CH); Evangelos S. Eleftheriou, Zurich (CH); Robert Allen Hutchins, Tucson, AZ (US); Glen Alan Jaquette, Tucson, AZ (US); Jens Jelitto, Rueschlikon (CH); Sedat Oelcer, Kilchberg (CH); Mark A. Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 11/346,391

(22) Filed: Feb. 1, 2006

(65) Prior Publication Data

US 2007/0177292 A1  Aug. 2, 2007

(51) Int. Cl.
*G11B 5/09* (2006.01)
(52) U.S. Cl. .......................................... 360/46; 360/51
(58) Field of Classification Search ....................... None
See application file for complete search history.

(56) References Cited

U.S. PATENT DOCUMENTS

| 4,353,099 | A | 10/1982 | Shum et al. |
| 4,433,424 | A | 2/1984 | Taber et al. |
| 5,295,128 | A | 3/1994 | Hutchins et al. |
| 5,359,631 | A | 10/1994 | Behrens et al. |
| 5,440,532 | A | 8/1995 | Yokogawa et al. |
| 5,457,581 | A | 10/1995 | Hallamasek |

(Continued)

FOREIGN PATENT DOCUMENTS

| EP | 0 901 125 A1 | 3/1999 |
| EP | 1 669 994 A1 | 6/2006 |
| WO | 01/18808 A1 | 3/2001 |
| WO | 01/80238 A1 | 10/2001 |
| WO | 2005/031738 A1 | 4/2005 |

OTHER PUBLICATIONS

U.S. Patent Application entitled "Read Channel Apparatus for Asynchronous Sampling and Synchronous Equalization", U.S. Appl. No. 11/213,127, filed Aug. 26, 2005, by inventors E.S. Eleftheriou, J. Jelitto, S. Oelcer, R. Hutchins and G. Jaquette.

(Continued)

*Primary Examiner*—Andrea Wellington
*Assistant Examiner*—Varsha A Kapadia
(74) *Attorney, Agent, or Firm*—David W. Victor; Konrad Raynes & Victor LLP (57) ABSTRACT

Provided is a read channel, storage drive, and method to process signals read from a storage medium. At least one data channel including an interpolator and equalizer and a servo channel includes an interpolator. A timing recovery function processes a timing error from the interpolator in the servo channel to calculate interpolation timing information used by the interpolator to interpolate a servo channel signal. A path is coupled to the timing recovery function and the interpolator in the at least one data channel to communicate the interpolation timing information to the interpolator in the at least one data channel. The interpolator in the at least one data channel is configured to use the interpolation timing information to interpolate an asynchronous data channel signal.

35 Claims, 8 Drawing Sheets

U.S. PATENT DOCUMENTS

| | | |
|---|---|---|
| 5,481,568 A | 1/1996 | Yada |
| 5,812,336 A | 9/1998 | Spurbeck et al. |
| 6,021,011 A | 2/2000 | Behrens et al. |
| 6,246,733 B1 | 6/2001 | Hutchins |
| 6,532,128 B1 * | 3/2003 | Bui et al. .................. 360/74.1 |
| 6,724,561 B1 | 4/2004 | Wyman |
| 6,781,778 B1 | 8/2004 | Molstad et al. |
| 6,865,050 B2 | 3/2005 | Nakao et al. |
| 6,879,457 B2 | 4/2005 | Eaton et al. |
| 2002/0154430 A1 | 10/2002 | Rae et al. |
| 2003/0043898 A1 | 3/2003 | Huang et al. |
| 2003/0053245 A1 * | 3/2003 | Ozdemir ................. 360/77.08 |
| 2007/0171565 A1 * | 7/2007 | Cherubini et al. ........ 360/77.12 |

OTHER PUBLICATIONS

F.M. Gardner, "Interpolation in Digital Modems—Part 1: Fundamentals", IEEE Transactions on Communications, vol. 41, No. 3, Mar. 1993, pp. 501-507.

R.C. Barrett, et al., "Timing-Based Track-Following Servo for Linear Tape Systems", IEEE Transactions on Magnetics, vol. 34, No. 4, Jul. 1998, pp. 1872-1877.

D. Berman, et al., "Enhanced Linear Interpolation for Low Sampling Rate Asynchronous Channels", IEEE 2001, pp. 3025-3028.

PCT International Search Report & Written Opinion dated Jun. 19, 2007 for Serial No. PCT/EP2007/050772 filed Jan. 26, 2007.

* cited by examiner

USING AT LEAST ONE SERVO CHANNEL TO PROVIDE TIMING RECOVERY AND TIMING INFORMATION TO DATA CHANNELS

BACKGROUND OF THE INVENTION

1. Field of the Invention

The present invention relates to a system and device for using at least one servo channel to provide timing recovery and timing information to data channels.

2. Description of the Related Art

Magnetic tape cartridges include magnetic tape to store data to be saved and read back at a subsequent time. A magnetic tape drive writes the data to magnetic tape, typically as a set of parallel tracks, and subsequently a magnetic tape drive reads back the data. To read back the data, a magnetic tape drive typically comprises parallel read heads to read each of the parallel tracks, a drive system for moving a magnetic tape with respect to the read heads such that the read heads may detect magnetic signals on the magnetic tape, and a read channel for digitally sampling magnetic signals sensed by the read heads and providing digital samples of the magnetic signals sensed by the read heads. The digital samples are then decoded into data bits, and the data bits from the parallel tracks are combined to reproduce the data originally written on the storage medium. The read channel typically requires, among other signal processing functions, an equalizer for each of the read heads to compensate for the change in the signal characteristics due to the magnetic recording properties of the write head, the magnetic tape, and the read head. Magnetic tape cartridges may be interchanged between tape drives, such that a magnetic tape written on one tape drive will be read by another tape drive.

In recent years, the capacity and performance of tape storage systems has increased considerably, and the potential for further growth appears to be substantial. In order to achieve higher cartridge capacities and improved performance, advances in several technical areas are necessary. A real density increase, i.e. increase in linear and/or track density is key to achieving higher storage capacities. Increases in linear density result in a decrease in the distance between adjacent bit cells, which leads to an increase in intersymbol-interference (ISI). Higher track density requiring narrower track width, narrower write/read heads and closer head spacing, leads to losses in signal-to-noise ratio (SNR). Also issues of intertrack-interference are of greater concern. With increasing areal densities, accurate timing recovery on all parallel data channels during tape operation is critical for achieving reliable data retrieval.

In current tape systems, two dedicated servo channels may be provided to derive longitudinal position (LPOS) information as well as a lateral position-error signal (PES). The timing-based track-following servo for linear tape systems has been adopted by the linear tape open (LTO) consortium as a standard for the so-called LTO tape drive systems.

In a read-channel architecture where the analog data channel signals are synchronously converted into the digital domain, an analog-to-digital converter (ADC) is driven by a variable frequency oscillator (VFO) that may be controlled by a digital timing-recovery unit such that the readback signal is sampled synchronously with respect to the boundaries of the write clock operating at the rate of 1/T, where T is the nominal interval between consecutive timing samples. Typically, the rate of the write clock is chosen such that a predetermined recording density is achieved. The synchronous signal samples are first equalized and then provided to the detection circuit. Timing information may be extracted from the equalized sample values and decisions provided by the detection circuit. This architecture in the context of tape systems comprising M parallel data tracks requires M analog VFOs and their associated feedback control loops.

In a read-channel architecture where the analog data channel signals are asynchronously converted into the digital domain, the ADC is driven by a fixed clock with rate 1/Ts and the sampling of the readback signal is done asynchronously with respect to the write clock boundaries. The synchronization of the signal samples is accomplished digitally using interpolative timing recovery (ITR). No analog feedback loops and associated VFOs are needed, making this approach attractive for multi-track tape systems.

In the latter architecture, the ITR function can take place after or before signal equalization, leading to asynchronous or synchronous equalization schemes, respectively. The asynchronous equalization scheme leads to a relatively short timing-loop delay since the equalizer is placed outside the timing loop. In a synchronous equalization scheme, the equalizer is within the timing loop and therefore introduces additional timing loop delay. However, because the equalizer operates, in this scheme, on signal samples for which synchronization has been accomplished, adaptive equalization may be easier to achieve than with asynchronous equalization. As an example of a synchronous equalization scheme, in optical storage systems two interpolators may generate two sequences of synchronous even-time and synchronous odd-time samples which are equalized by means of two 2T-spaced synchronous equalizers before sequence detection.

With the current systems, timing recovery is performed by timing-recovery loops within each data channel that employ the interpolator output signal to perform the timing recovery operation individually for each data channel. The timing-recovery algorithms typically use equalized signal samples to determine the time instants at which signal sampling must occur.

SUMMARY

Provided is a read channel, storage drive, and method to process signals read from a storage medium. At least one data channel including an interpolator and equalizer and a servo channel includes an interpolator. A timing recovery function processes a timing error from the interpolator in the servo channel to calculate interpolation timing information used by the interpolator to interpolate a servo channel signal. A path is coupled to the timing recovery function and the interpolator in the at least one data channel to communicate the interpolation timing information to the interpolator in the at least one data channel. The interpolator in the at least one data channel is configured to use the interpolation timing information to interpolate an asynchronous data channel signal.

In a further embodiment, each data channel and the servo channel includes an analog-to-digital converter (ADC), further comprising:

In a further embodiment, an oscillator provides a clock signal to each ADC in each data channel and the servo channel.

In a further embodiment, the timing recovery function is implemented in the servo channel and the asynchronous data channel signal is interpolated to a synchronous signal.

In a further embodiment, the timing recovery function is further configured to calculate interpolation timing information by using a timing error to calculate a timing correction to adjust an interpolation interval between two samples generated by the interpolator. A new interpolation instant is used to determine coefficients used by the interpolator to interpolate the servo channel signal.

In a further embodiment, the timing recovery function implements a loop filter of a second order loop to generate the timing correction from the timing error.

In a further embodiment, the interpolation timing information communicated on the path to each data channel comprises the timing corrections. Each data channel is configured to calculate the coefficients used by the interpolator from the timing corrections.

In a further embodiment, the servo channel comprises a first servo channel, the interpolator in the servo channel comprises a first interpolator, and the timing recovery function comprises a first timing recovery function included in the first servo channel, and the path comprises a first path. A second servo channel includes: a second interpolator; a second timing recovery function for processing a timing error from the second interpolator to calculate interpolation timing information used by the interpolator to interpolate a servo channel signal input to the second servo channel; and a second path coupled to the second timing recovery function and the interpolator in the at least one data channel to communicate the interpolation timing information to the interpolator in the at least one data channel. The interpolator in the at least one data channel is configured to use the interpolation timing information to interpolate an asynchronous data channel signal. A monitoring function selects one of the first or second servo channel to supply interpolation time instants to the at least one data channel.

In a further embodiment, the servo channel comprises a first servo channel, the interpolator in the servo channel comprises a first interpolator, and the path comprises a first path. A second servo channel includes a second interpolator. The timing recovery function is configured to process the timing error from the first and second interpolators in the first and second servo channels to calculate the interpolation timing information.

In a further embodiment, the timing recovery function is configured to combine the timing error from the first and second interpolators and use the combined timing error to calculate a timing correction to adjust an interpolation interval between two samples generated by the interpolators in the servo channels. A new interpolation instant is used to determine coefficients used by the interpolator in the at least one data channel.

In a further embodiment, the timing errors are combined by assigning a greater weighting to the timing error from the first or second interpolator providing an interpolated signal having a better signal-to-noise ratio than the timing error from the other interpolator.

In a further embodiment, the at least one data channel comprises a first and second data channels. The first data channel includes a first interpolator and first adaptive equalizer that equalizes the signal from the first interpolator. The second data channel includes a second interpolator and second adaptive equalizer that equalizes the signal from the second interpolator. A signal processing component processes equalized output signals from the first and second adaptive equalizers to provide feedback to the first and second interpolators to improve quality of interpolation.

In a further embodiment, wherein the signal processing component is configured to provide feedback to the first and second adaptive equalizers to improve quality of equalization and cancel cross-track interference.

In a further embodiment, the signal processing component comprises a multiple-input and multiple output (MIMO) system.

In a further embodiment, there are a plurality of data channels each including one equalizer and interpolator. The timing recovery function provides the interpolation timing information to the interpolators in the data channels.

DETAILED DESCRIPTION

Figure 1:
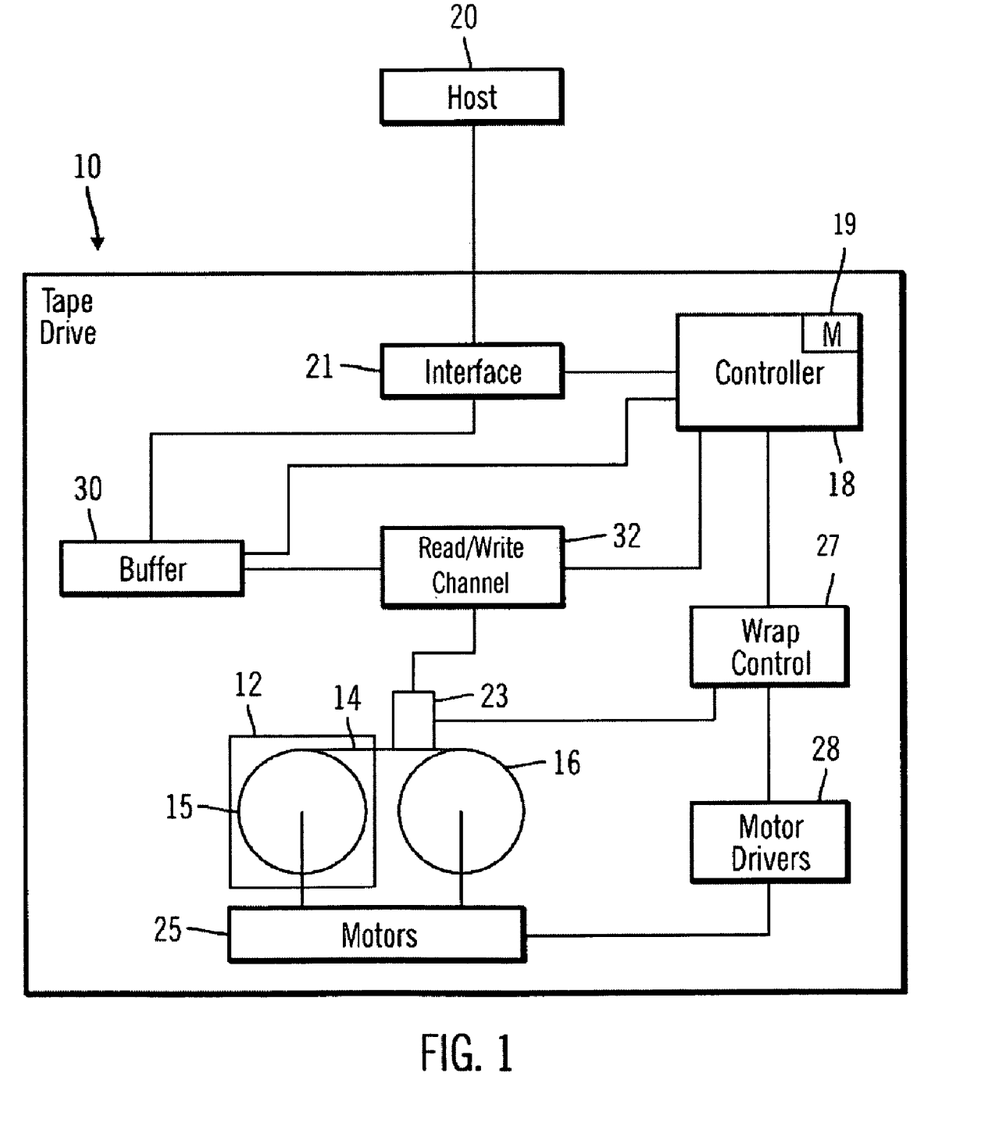
FIG. 1 illustrates an embodiment of a tape drive.

FIG. 1 illustrates an embodiment of a magnetic tape drive 10. The magnetic tape drive provides a means for reading and writing information with respect to a magnetic tape 14 of a magnetic tape cartridge 12. Magnetic tape cartridges include a magnetic tape storage medium to record data to be retrieved at a subsequent time. Further, the magnetic tape cartridges may be interchanged between tape drives, such that a magnetic tape written on one tape drive will be read by another tape drive. The magnetic tape cartridge 12 comprises a length of magnetic tape 14 wound on one or two reels 15, 16.

A single reel magnetic tape cartridge 12 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive. In alternative embodiments, additional tape formats that may be used include Digital Linear Tape (DLT), Digital Audio Tape (DAT), etc.

The magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc. The magnetic tape cartridge 12 may be inserted in the magnetic tape drive 10, and loaded by the magnetic tape drive so that one or more read and/or write heads 23 of the recording system read and/or write information in the form of signals with respect to the magnetic tape 14 as the tape is moved longitudinally by motors 25 which rotate the reels 15, 16. The magnetic tape typically comprises a plurality of parallel tracks, or groups of tracks. In certain tape formats, such as the LTO format, the tracks are arranged in a serpentine back and forth pattern of separate wraps, as is known to those of skill in the art. Also as known to those of skill in the art, the recording system may comprise a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a read/write channel 32, as is known to those of skill in the art.

The tape drive 10 system further includes motors 25 and reels 15, 16 to move the magnetic tape 14 with respect to the read head(s) 23 such that the read head(s) may detect magnetic signals on the magnetic tape. A read channel of the read/write channel 32 digitally samples the magnetic signals detected by the read head(s) to provide digital samples of the magnetic signals for further processing.

Figure 2:
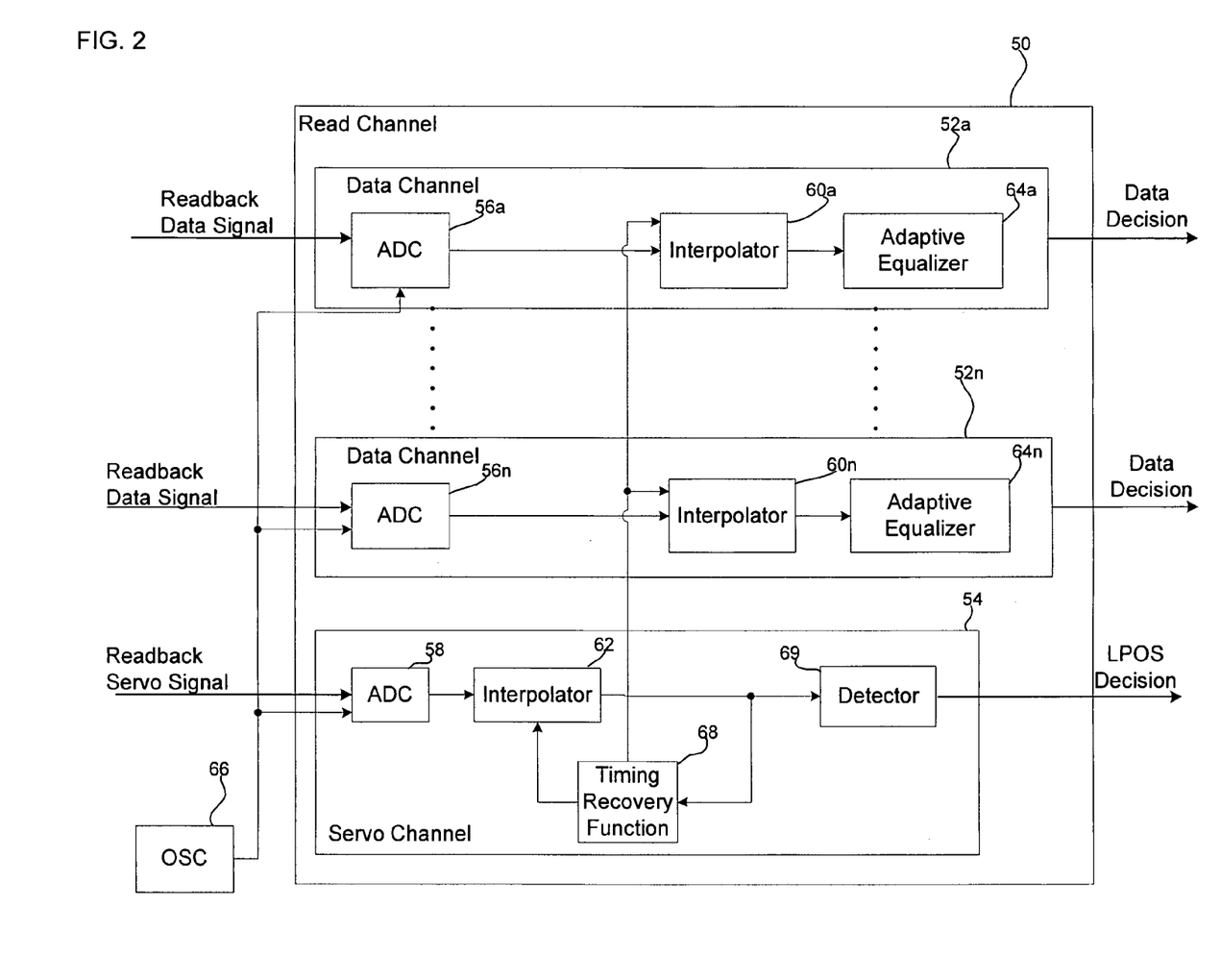
FIGS. 2-7 illustrate embodiments of a read channel including timing recovery components.

FIG. 2 illustrates an embodiment of a read channel 50 for a multi-track storage system, such as a tape drive. The read channel 50 may comprise a portion of a read channel of the read/write channel 32 of FIG. 1. The read channel 50 includes a plurality of data channels 52a . . . 52n and one servo channel 54. The data channels 52a . . . 52n and the servo channel 54 respectively include analog-to-digital converters (ADCs) 56a . . . 56n and 58 that process readback data and servo signals read from the storage medium, e.g., tape, and convert the signals to digital signals that are provided to interpolators 60a . . . 60n and 62. The output signals of the ADCs 56a . . . 56n in the data channels 52a . . . 52n may be processed by digital front-end functions before being provided to the interpolators 60a . . . 60n to transform the signals from the asynchronous time domain to the synchronous domain. The data channels 52a . . . 52n further include adaptive equalizers 64a . . . 64n to equalize the signals in the synchronous domain. In one embodiment, a single oscillator (OSC) 66 provides clock signals to drive the ADCs 56a . . . 56n and 58

The servo channel 54 further includes a detector 69 that receives the adjusted synchronous signal from the interpolator 62 to determine the servo information represented by the digital samples. The output from the detector 69 may further include longitudinal position (LPOS) information, which comprises longitudinal position information in the tape. The servo channel 54 further includes a timing recovery function 68 comprising circuitry that processes interpolated signal samples, which may be regarded as timing errors, from the interpolator 62 to generate interpolation timing information that is supplied to the interpolators 60a . . . 60n in the data channels to use to generate synchronous sample sequences.

Figure 3:
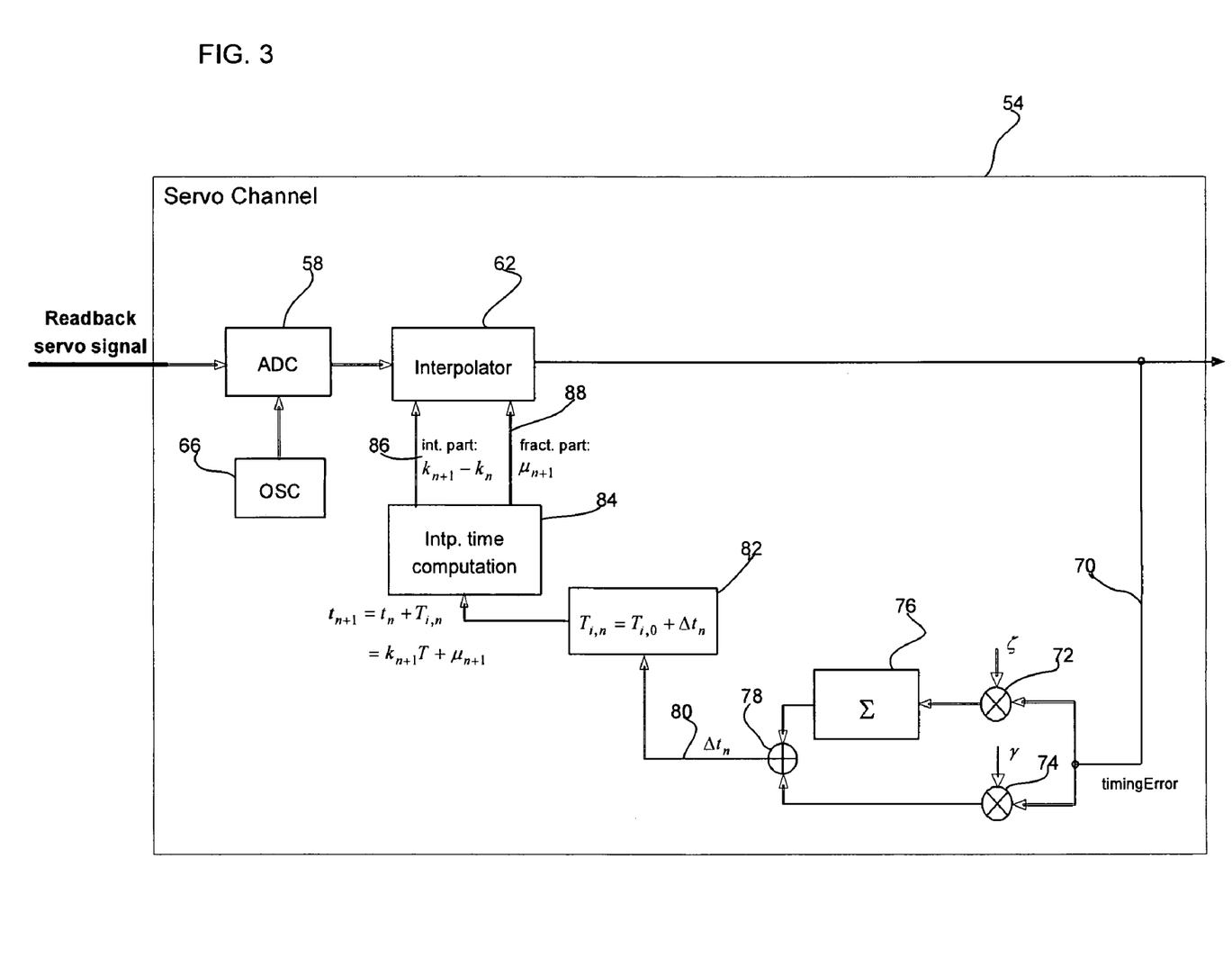

FIG. 3 provides further detail of the servo channel 54 shown in FIG. 2. A timing error 70 from the interpolator 62 is supplied to two multipliers 72 and 74 that multiply the timing error 70 by the loop parameters $\zeta$ and $\gamma$. The result of the multiplication at the multiplier 72 is supplied to the integrator 76, and the output of the integrator 76 is added by adder 78 to the result of the multiplication at multiplier 74 to produce the timing correction instants $\Delta t_n$ 80. The multipliers 72, 74, integrator 76, and adder 78 comprise a loop filter of the second order. The computed timing correction instants $\Delta t_n$ 80 are supplied to the interpolation interval computation circuit 82. Timing intervals T are calculated at circuit 82 such that $T_{i,n} = T_{i,0} + \Delta t_n$, where $T_{i,0}$ denotes the nominal interpolation interval, and $T_{i,n}$ is the actual interval between consecutive sampling instances n and n+1, at which interpolated signal samples are generated by the interpolator 62. The interpolation time computation 84 circuit indicates an integer number of ADC sampling intervals $(k_{n+1} - k_n)$ 86 and a fractional interval $(0 \leq \mu_{n+1} < 1)$ 88 that are provided to the interpolator 62 to use to transform the sequence of input signal samples from the asynchronous to the synchronous domain.

The timing recovery function 68 may provide the timing correction instants $\Delta t_n$ 80 to the data channel interpolators 60a . . . 60n to use to compute the integer and fractional intervals used for interpolation or, alternatively, the timing recovery function 68 may provide the calculated integer 86 and fractional 88 intervals to the data channel interpolators 60a . . . 60n.

Figure 4:
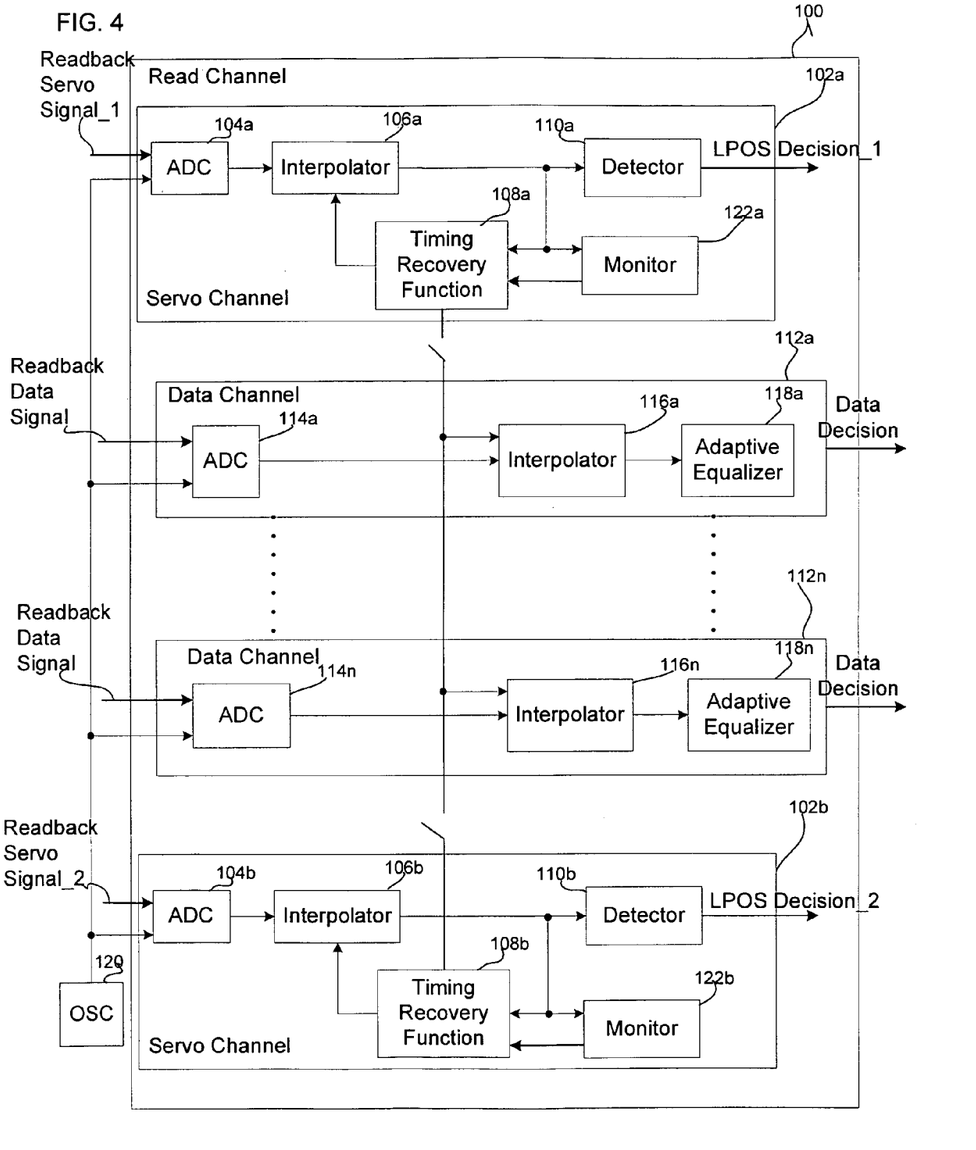

FIG. 4 illustrates a further embodiment of a read channel 100 including two servo channels 102a and 102b that each includes an ADC 104a, 104b, interpolator 106a, 106b, timing recovery function 108a, 108b, and detector 110a, 110b. The servo channels 102a and 102b may implement the timing recovery function 68 described with respect to FIGS. 2 and 3. The read channel 100 further includes multiple data channels 112a . . . 112n, wherein each data channel respectively includes an ADC 114a . . . 114n, interpolator 116a . . . 116n, and adaptive equalizer 118a . . . 118n. The data channel interpolators 116a . . . 116n receive timing information, such as the timing correction instants $\Delta t_n$, from the timing recovery function 108a, 108b from one of the servo channels 102a, 102b to use for interpolation. A single oscillator (OSC) 120 supplies clock signals to the ADCs 104a, 104b, 114a . . . 114n.

In the embodiment of FIG. 4, each servo channel includes a monitoring function 122a, 122b that determines the reliability of the servo channels 102a and 102b. The monitoring functions 122a, 122b may communicate to determine which servo channel 102a, 102b produces timing information having a higher reliability, such as timing information that is obtained by a servo signal having a higher signal-to-distortion ratio and/or lower disturbances. The servo channel 102a or 102b providing more reliable timing information may then be used to supply the timing information to the data channel interpolators 116a . . . 116n. The monitoring functions 122a, 122b may periodically check the reliability to determine if the system needs to switch to using the other timing recovery function 108a, 108b to supply the timing information. In an alternative embodiment, the monitoring functions 122a, 122b may estimate LPOS error rates for the servo channels 102a, 102b. In the case the servo channel 102a or 102b, which is being used to supply the timing information to the data channel interpolators 116a . . . 116n, exhibits higher LPOS error rate than the other servo channel, the servo channel 102a or 102b not currently supplying timing information is then selected to provide the timing information to the data channel interpolators 116a . . . 116n. In this way, the monitoring functions 122a, 122b are together used to select one of the servo channels 102a and 102b to supply the timing information to the data channel interpolators 116a . . . 116n, such that the servo channel 102a or 102b producing better quality timing information is selected to provide the timing information.

Figure 5:
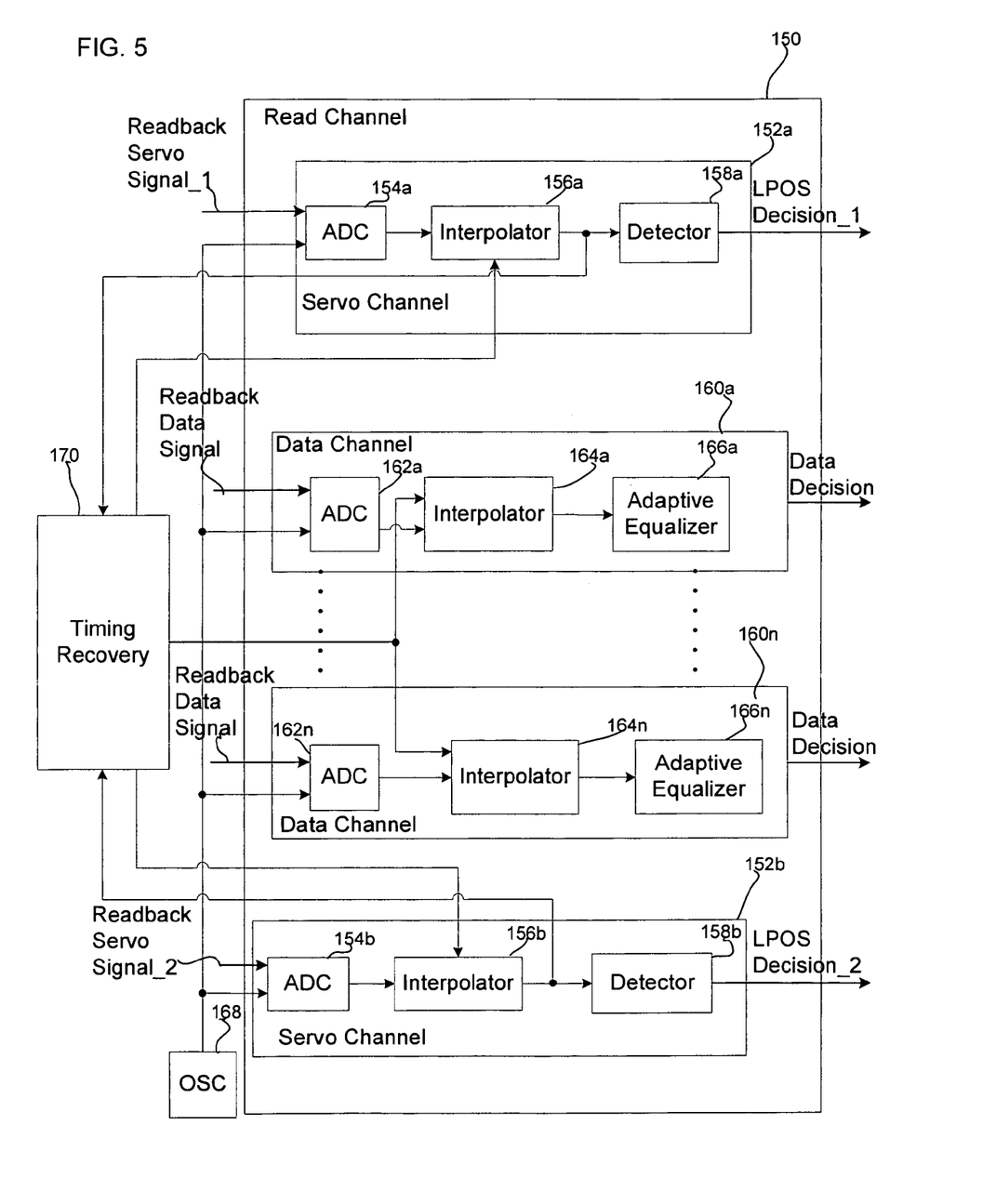

FIG. 5 illustrates an additional embodiment of the read channel 150 including two servo channels 152a and 152b, wherein each servo channel respectively includes an ADC 154a, 154b, an interpolator 156a, 156b, and detector 158a, 158b. The read channel 150 further includes multiple data channels 160a . . . 160n, wherein each read channel respectively includes an ADC 162a . . . 162n, interpolator 164a . . . 164n, and adaptive equalizer 166a . . . 166n. A single oscillator (OSC) 168 supplies clock signals to the ADCs 154a, 154b, 162a . . . 162n. In the embodiment of FIG. 5, the timing recovery function 170 is located external to the servo channels 152a, 152b. The timing recovery function 170 combines the timing errors from both servo channels 152a, 152b and then calculates the timing correction instants $\Delta t_n$ in the manner described above. The timing recovery function 170 supplies timing corrections to the data channel interpolators 164a . . . 164n and the servo channel interpolators 156a, 156b.

Figure 6:
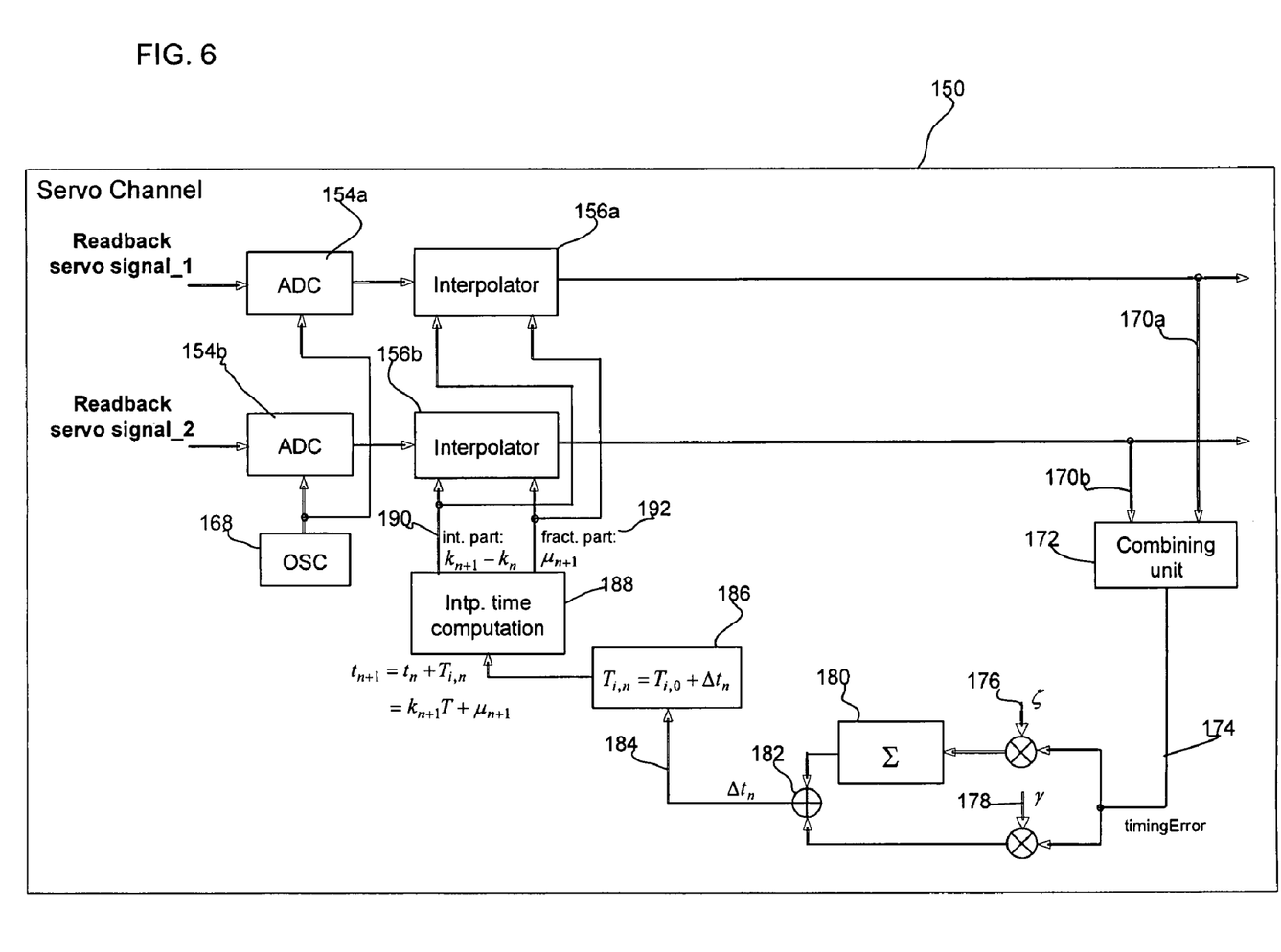

FIG. 6 provides further detail of the data/servo read channel 150 shown in FIG. 5. Timing errors 170a, 170b from the servo channel interpolators 156a, 156b are supplied to a combining unit 172 that weights the timing errors 170a, 170b from the different servo channels to produce a combined timing error 174. The combining unit 172 may assign a greater weighting to the timing error from the one of the two interpolators 156a, 156b providing an interpolated signal with the better signal-to-noise ratio or least amount of error or degradation. The combined timing error 174 is then provided to multipliers 176 and 178 that multiply the timing error 174 by $\zeta$ and $\gamma$, respectively. The result of the multiplication at the multiplier 176 is supplied to an integrator 180, and the output of the integrator 180 is added by adder 182 to the result of the multiplication at multiplier 178 to produce the timing correction instants $\Delta t_n$ 184. The multipliers 176, 178, integrator 180, and adder 182 comprise a loop filter of the second order. The computed timing correction instants $\Delta t_n$ 184 are supplied to the interpolation interval computation circuit 186. Timing intervals T are calculated at circuit 186 such that $T_{i,n} = T_{i,0} + \Delta t_n$, where $T_{i,0}$ denotes the nominal interpolation interval, and $T_{i,n}$ is the actual interval between consecutive sampling instances n and n+1, at which interpolated signal samples are generated by the interpolators 156a, 156b. The interpolation time computation 188 circuit indicates an integer number of ADC sampling intervals $(k_{n+1} - k_n)$ 190 and a fractional interval $(0 \leq \mu_{n+1} < 1)$ 192 that are provided to the interpolators 156a, 156b to use to transform the sequences of input signal samples from the asynchronous to the synchronous domain.

The timing recovery function 170 which may implement the combining unit 172, the loop filter of the second order (i.e., components 176, 178, 180, and 182), the circuit 186, and the interpolator time computation unit 188 may provide the timing correction instants $\Delta t_n$ 184 to the data channel interpolators 164a . . . 164n to use to compute the integer and fractional intervals used for interpolation or, alternatively, the timing recovery function 170 may provide the calculated integer 190 and fractional 192 intervals to the data channel interpolators 164a . . . 164n.

Figure 7:
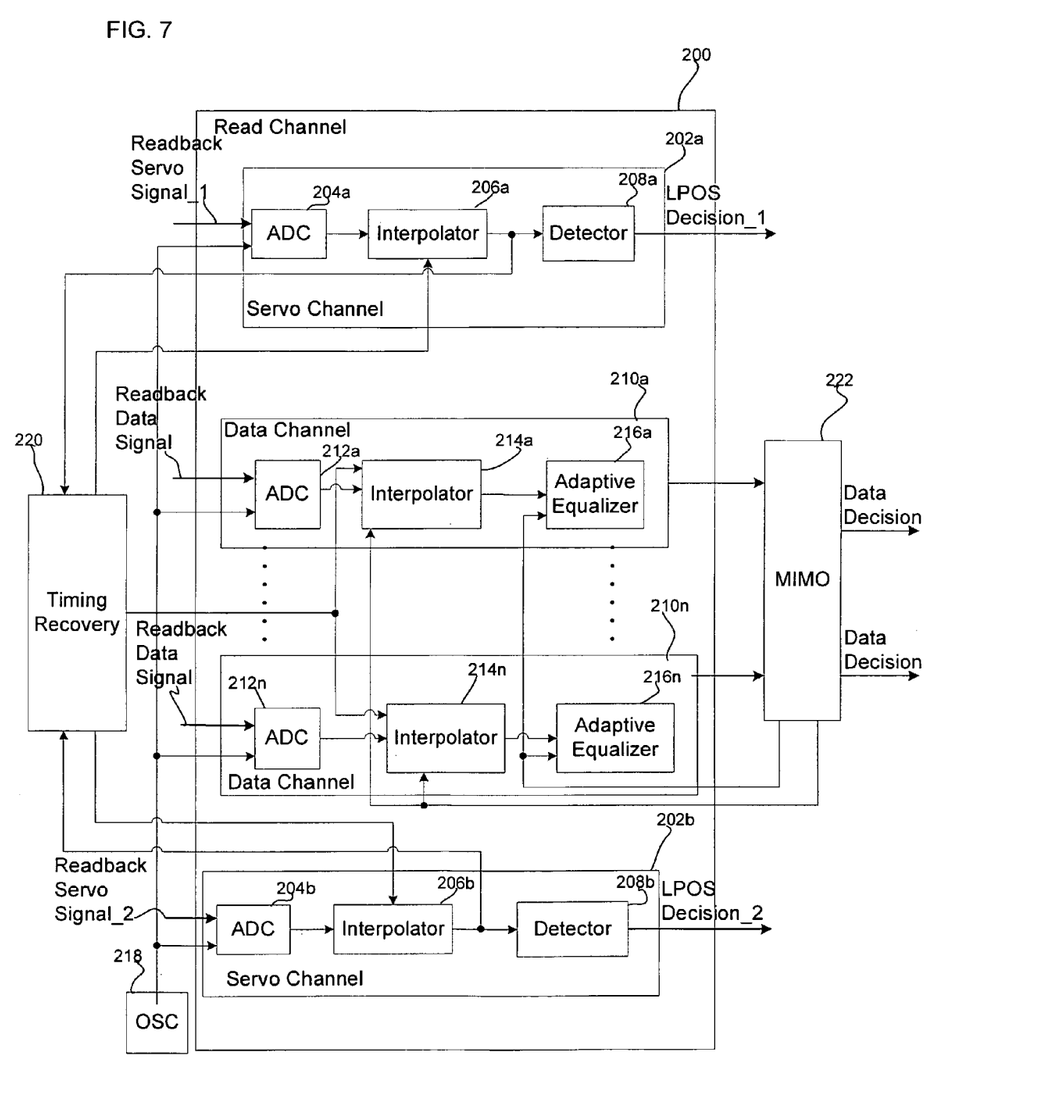

FIG. 7 illustrates an additional embodiment of a read channel 200, where the read channel of FIG. 6 is modified to include a multiple input, multiple output (MIMO) digital signal processor and detector. The read channel 200 components 202a, 202b, 204a, 204b, 206a, 206b, 208a, 208b, 210a . . . 210n, 212a . . . 212n, 214a . . . 214n, 216a . . . 216n, 218, and 220 are the same as the read channel 150 components 152a, 152b, 154a, 154b, 156a, 156b, 158a, 158b, 160a . . . 160n, 162a . . . 162n, 164a . . . 164n, 166a . . . 166n, 168, and 170, respectively, described with respect to FIG. 5. Further, the timing recovery function 220 may implement the timing recovery components described with respect to FIG. 6. The read channel 200 additionally includes a MIMO system 222 that receives the output from the adaptive equalizers 216a . . . 216n to process all the equalizer output signals together to generate feedback which the MIMO system 222 provides to the interpolators 214a . . . 214n and adaptive equalizers 216a . . . 216n to improve system performance especially in the presence of inter-track interference. The MIMO feedback is provided for cross-equalization and cancellation of interference signals, to improve adaptivity across channels, and to improve the quality of interpolation. The MIMO feedback to the data channel interpolators 214a . . . 214n improves the quality of the generation of the signals using the timing correction instants $\Delta t_n$.

Figure 8:
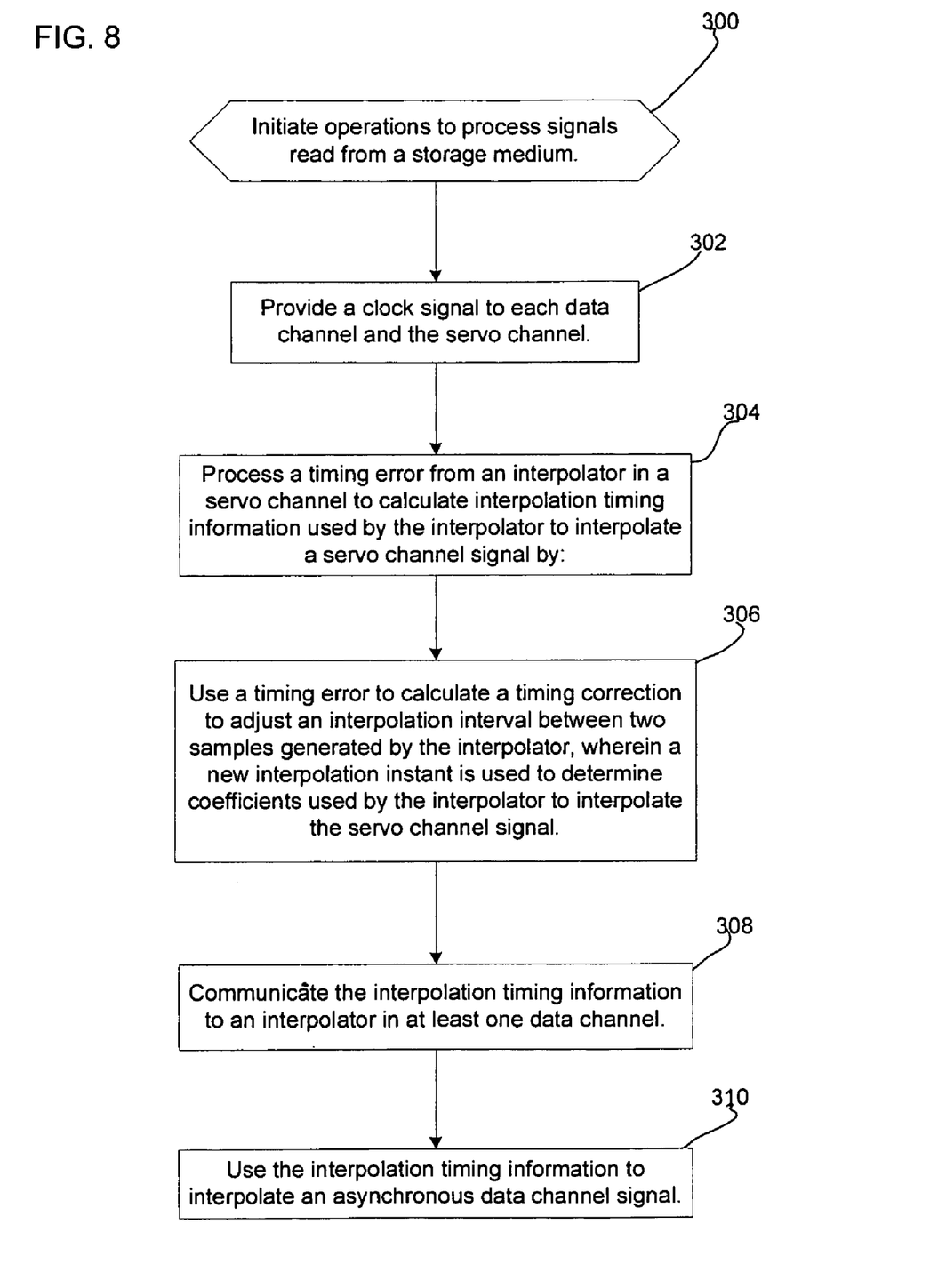
FIG. 8 illustrates an embodiment of operations to process signals and calculate interpolation timing information.

FIG. 8 illustrates operations performed by the components in the read channels described above to obtain and use timing information. Upon initiating (at block 300) operations to process signals read from a storage medium, a clock signal is provided (at block 302) to each data channel and a servo channel. A timing error is processed (at block 304) from an interpolator in a servo channel to calculate interpolation timing information used by the interpolator to interpolate a servo channel signal. The timing error may be used (at block 306) to calculate a-timing correction to adjust an interpolation interval between two samples generated by the interpolator. A new interpolation instant is used to determine coefficients used by the interpolator to interpolate the servo channel signal. The interpolation timing information is communicated (at block 308) to an interpolator in at least one data channel. The interpolation timing information is used (at block 310) to interpolate an asynchronous data channel signal, wherein the asynchronous data channel signal is interpolated to a synchronous signal.

Described embodiments provide techniques to obtain timing information from one or more servo channel signals that is supplied to multiple data channels. The data channel signals are digitally interpolated to generate synchronous sample sequences using the timing information from one or more of the servo channels. Described embodiments may further provide decoupling of the adaptive equalization and timing recovery.

The described components of the read channels 32, 50, 100, 150, and 200 described in FIGS. 1-7 may comprise discrete logic, ASIC (application specific integrated circuit), FPGA (field programmable gate array), custom processors, etc.

The described components of the read channel embodiments and the operations of the read channel components described with respect to FIGS. 2-7 may alternatively be implemented in subroutines in programs or other software implementations executed by a processor. Such programs implementing the operations of the read channel components described with respect to FIGS. 2-7 may be implemented in a computer readable medium, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

Components in FIGS. 1-7 shown as separate components may be implemented in a single circuit device or functions of one illustrated component may be implemented in separate circuit devices. Moreover, operations described with respect to certain components, such as the timing recovery, may be performed by other components in the read channel external to the specific timing recovery circuit.

Those of skill in the art will understand that changes may be made with respect to the components illustrated herein. Further, those of skill in the art will understand that differing specific component arrangements may be employed than those illustrated herein.

The foregoing description of various embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A read channel incorporated in a storage device to process signals read from a storage medium, comprising:
    at least one data channel including an interpolator and equalizer;
    a servo channel including an interpolator;
    a timing recovery function for processing a timing error from the interpolator in the servo channel to calculate interpolation timing information used by the interpolator to interpolate a servo channel signal; and
    a path coupled to the timing recovery function and the interpolator in the at least one data channel to communicate the interpolation timing information to the interpolator in the at least one data channel, wherein the interpolator in the at least one data channel is configured to use the interpolation timing information to interpolate an asynchronous data channel signal.

2. The read channel of claim 1, wherein each data channel and the servo channel includes an analog-to-digital converter (ADC), further comprising:
    an oscillator for providing a clock signal to each ADC in each data channel and the servo channel.

3. The read channel of claim 1, wherein the timing recovery function is implemented in the servo channel, and wherein the asynchronous data channel signal is interpolated to a synchronous signal.

4. The read channel of claim 1, wherein the timing recovery function is further configured to calculate interpolation timing information by:
    using a timing error to calculate a timing correction to adjust an interpolation interval between two samples generated by the interpolator, wherein a new interpolation instant is used to determine coefficients used by the interpolator to interpolate the servo channel signal.

5. The read channel of claim 4, wherein the timing recovery function implements a loop filter of a second order loop to generate the timing correction from the timing error.

6. The read channel of claim 4, wherein the interpolation timing information communicated on the path to each data channel comprises the timing corrections, and wherein each data channel is configured to calculate the coefficients used by the interpolator from the timing corrections.

7. The read channel of claim 1, wherein the servo channel comprises a first servo channel, wherein the interpolator in the servo channel comprises a first interpolator, and wherein the timing recovery function comprises a first timing recovery function included in the first servo channel, and wherein the path comprises a first path, further comprising:
    a second servo channel including:
        a second interpolator;
        a second timing recovery function for processing a timing error from the second interpolator to calculate interpolation timing information used by the interpolator to interpolate a servo channel signal input to the second servo channel; and
        a second path coupled to the second timing recovery function and the interpolator in the at least one data channel to communicate the interpolation timing information to the interpolator in the at least one data channel, wherein the interpolator in the at least one data channel is configured to use the interpolation timing information to interpolate an asynchronous data channel signal; and
    a monitoring function to select one of the first or second servo channel to supply interpolation time instants to the at least one data channel.

8. The read channel of claim 1, wherein the servo channel comprises a first servo channel, wherein the interpolator in the servo channel comprises a first interpolator, and wherein the path comprises a first path, further comprising:
    a second servo channel including a second interpolator, wherein the timing recovery function is configured to process the timing error from the first and second interpolators in the first and second servo channels to calculate the interpolation timing information.

9. The read channel of claim 8, wherein the timing recovery function is configured to combine the timing error from the first and second interpolators and use the combined timing error to calculate a timing correction to adjust an interpolation interval between two samples generated by the interpolators in the servo channels, wherein a new interpolation instant is used to determine coefficients used by the interpolator in the at least one data channel.

10. The read channel of claim 9, wherein the timing errors are combined by assigning a greater weighting to the timing error from the first or second interpolator providing an interpolated signal having a better signal-to-noise ratio than the timing error from the other interpolator.

11. The read channel of claim 8, wherein the at least one data channel comprises a first and second data channels, wherein the first data channel includes a first interpolator and first adaptive equalizer that equalizes the signal from the first interpolator, wherein the second data channel includes a second interpolator and second adaptive equalizer that equalizes the signal from the second interpolator, further comprising:
    a signal processing component for processing equalized output signals from the first and second adaptive equalizers to provide feedback to the first and second interpolators to improve quality of interpolation.

12. The read channel of claim 11, wherein the signal processing component is configured to provide feedback to the first and second adaptive equalizers to improve quality of equalization and cancel cross-track interference.

13. The read channel of claim 11, wherein the signal processing component comprises a multiple-input and multiple output (MIMO) system.

14. The read channel of claim 1, wherein there are a plurality of data channels each including one equalizer and interpolator, and wherein the timing recovery function provides the interpolation timing information to the interpolators in the data channels.

15. A storage drive for performing Input/Output (I/O) operations with respect to a storage medium coupled to the storage drive, comprising:
    a head to read data from the storage medium; and
    a read channel in data communication with the head to process signals the head reads from the storage medium, comprising:
        at least one data channel including an interpolator and equalizer;
        a servo channel including an interpolator;
        a timing recovery function for processing a timing error from the interpolator in the servo channel to calculate interpolation timing information used by the interpolator to interpolate a servo channel signal; and a path coupled to the timing recovery function and the interpolator in the at least one data channel to communicate the interpolation timing information to the interpolator in the at least one data channel, wherein the interpolator in the at least one data channel is configured to use the interpolation timing information to interpolate an asynchronous data channel signal.

16. The storage drive of claim 15, wherein each data channel and the servo channel includes an analog-to-digital converter (ADC), further comprising:
an oscillator for providing a clock signal to each ADC in each data channel and the servo channel.

17. The storage drive of claim 15, wherein the timing recovery function is implemented in the servo channel, and wherein the asynchronous data channel signal is interpolated to a synchronous signal.

18. The storage drive of claim 15, wherein the timing recovery function is further configured to calculate interpolation timing information by:
using a timing error to calculate a timing correction to adjust an interpolation interval between two samples generated by the interpolator, wherein a new interpolation instant is used to determine coefficients used by the interpolator to interpolate the servo channel signal.

19. The storage drive of claim 18, wherein the interpolation timing information communicated on the path to each data channel comprises the timing corrections, and wherein each data channel is configured to calculate the coefficients used by the interpolator from the timing corrections.

20. The storage drive of claim 18, wherein the servo channel comprises a first servo channel, wherein the interpolator in the servo channel comprises a first interpolator, and wherein the timing recovery function comprises a first timing recovery function included in the first servo channel, and wherein the path comprises a first path, wherein the read channel further comprises:
a second servo channel including:
a second interpolator;
a second timing recovery function for processing a timing error from the second interpolator to calculate interpolation timing information used by the interpolator to interpolate a servo channel signal input to the second servo channel; and
a second path coupled to the second timing recovery function and the interpolator in the at least one data channel to communicate the interpolation timing information to the interpolator in the at least one data channel, wherein the interpolator in the at least one data channel is configured to use the interpolation timing information to interpolate an asynchronous data channel signal; and
a monitoring function to select one of the first or second servo channel to supply interpolation time instants to the at least one data channel.

21. The storage drive of claim 15, wherein the servo channel comprises a first servo channel, wherein the interpolator in the servo channel comprises a first interpolator, and wherein the path comprises a first path, wherein the read channel further comprises:
a second servo channel including a second interpolator, wherein the timing recovery function is configured to process the timing error from the first and second interpolators in the first and second servo channels to calculate the interpolation timing information.

22. The storage drive of claim 21, wherein the timing recovery function is configured to combine the timing error from the first and second interpolators and use the combined timing error to calculate a timing correction to adjust an interpolation interval between two samples generated by the interpolators in the servo channels, wherein a new interpolation instant is used to determine coefficients used by the interpolator in the at least one data channel.

23. The storage drive of claim 22, wherein the at least one data channel comprises a first and second data channels, wherein the first data channel includes a first interpolator and first adaptive equalizer that equalizes the signal from the first interpolator, wherein the second data channel includes a second interpolator and second adaptive equalizer that equalizes the signal from the second interpolator, wherein the read channel comprises:
a signal processing component for processing equalized output signals from the first and second adaptive equalizers to provide feedback to the first and second interpolators to improve quality of interpolation.

24. The storage drive of claim 23, wherein the signal processing component comprises a multiple-input and multiple output (MIMO) system.

25. The storage drive of claim 15, wherein the read channel includes a plurality of data channels each including one equalizer and interpolator, and wherein the timing recovery function provides the interpolation timing information to the interpolators in the data channels.

26. A method to process signals read from a storage medium, comprising:
processing a timing error from an interpolator in a servo channel to calculate interpolation timing information used by the interpolator to interpolate a servo channel signal;
communicating the interpolation timing information to an interpolator in at least one data channel; and
using the interpolation timing information to interpolate an asynchronous data channel signal.

27. The method of claim 26, further comprising:
providing a clock signal to each data channel and the servo channel.

28. The method of claim 26, wherein the asynchronous data channel signal is interpolated to a synchronous signal.

29. The method of claim 26, wherein calculating the interpolation timing information further comprises:
using a timing error to calculate a timing correction to adjust an interpolation interval between two samples generated by the interpolator, wherein a new interpolation instant is used to determine coefficients used by the interpolator to interpolate the servo channel signal.

30. The method of claim 29, wherein the interpolation timing information communicated to each data channel comprises the timing corrections, and wherein each data channel is configured to calculate the coefficients used by the interpolator from the timing corrections.

31. The method of claim 26, wherein the timing error comprises a first timing error, wherein the calculated interpolation timing information comprises first interpolation timing information, wherein the interpolator using the first interpolation timing information comprises a first interpolator, and wherein the servo channel comprises a first servo channel, wherein the first servo channel comprises a first servo channel signal interpolated by the first interpolator, further comprising:
processing, at a second servo channel, a second timing error from a second interpolator to calculate second interpolation timing information used by the second interpolator to interpolate a second servo channel signal;

selecting one of the first or second servo channel to supply interpolation time instants to the at least one data channel.

32. The method of claim 26, wherein the servo channel comprises a first servo channel, wherein the interpolator in the servo channel comprises a first interpolator, further comprising:
processing the timing error from the first interpolator in the first servo channel and a second interpolator in a second servo channel to calculate the interpolation timing information.

33. The method of claim 32, further comprising:
combining the timing error from the first and second interpolators; and
using the combined timing error to calculate a timing correction to adjust an interpolation interval between two samples generated by the interpolators in the servo channels, wherein a new interpolation instant is used to determine coefficients used by the interpolator in the at least one data channel.

34. The method of claim 32, further comprising:
processing equalized output signals from first and second adaptive equalizers to provide feedback to first and second interpolators to improve quality of interpolation.

35. The method of claim 26, wherein there are a plurality of data channels each including one equalizer and interpolator, further comprising:
providing the interpolation timing information to the interpolators in the data channels.

* * * * *